Aug. 9, 1966

A. I. BOLOTIN 3,265,434

AUXILIARY SUN GLARE SHIELD

Filed Sept. 1, 1964

Aug. 9, 1966   A. I. BOLOTIN   3,265,434
AUXILIARY SUN GLARE SHIELD
Filed Sept. 1, 1964   2 Sheets-Sheet 2
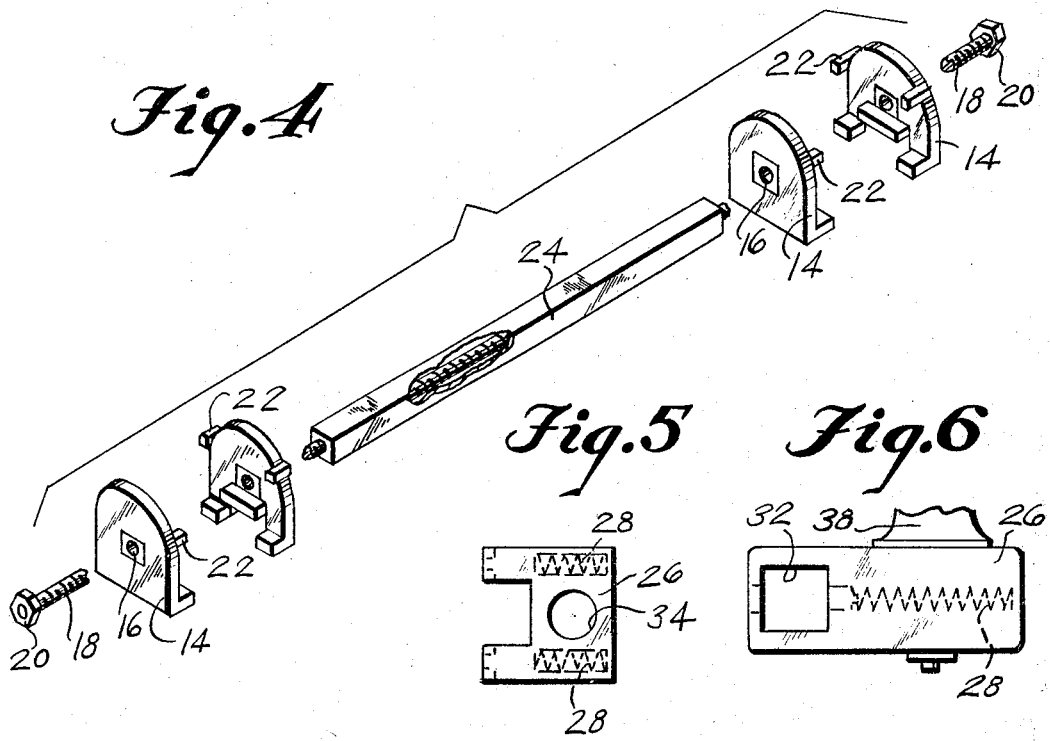
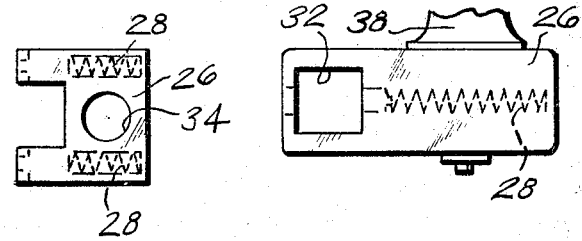
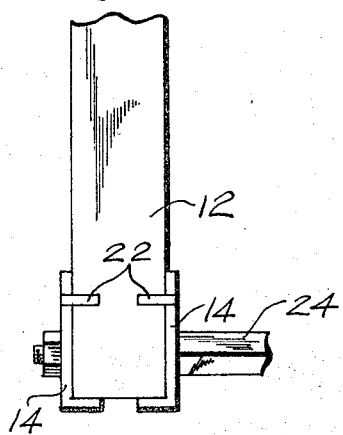
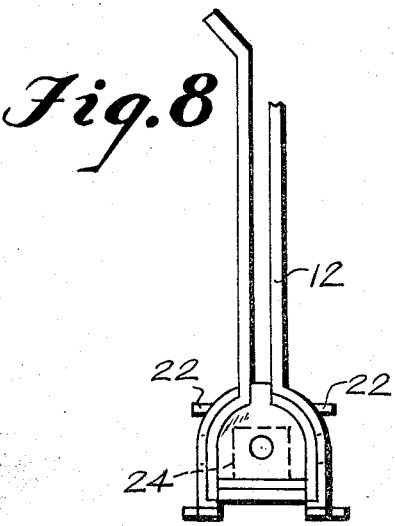

United States Patent Office 3,265,434
Patented August 9, 1966

3,265,434
AUXILIARY SUN GLARE SHIELD
Abraham Ivon Bolotin, 1236 S. Carob Way,
Montebello, Calif.
Filed Sept. 1, 1964, Ser. No. 393,520
7 Claims. (Cl. 296—97)

This invention relates to visors, and more particularly to an adjustable attachment for automotive vehicles.

It is an object of the present invention to provide a portable sun glare shade which will be easily clipped to the existing sun visor within automotive vehicles.

Another object of the present invention is to provide a portable sun glare shade which will be adjustable to the extent that it may be moved throughout 360 degrees.

A further object of the present invention is to provide a portable sun glare shade which will be traversed along a support rod mounted to the sun visor existing within the vehicle and will have a spring loaded rub plate to hold the shade in any desired position.

A still further object of the present invention is to provide a sun glare shade which can be quickly and easily installed without the use of tools and will be light in weight.

Other objects of the invention are to provide a portable sun glare shade bearing the above objects in mind which is of simple construction, has a minimum number of parts, is inexpensive to manufacture, has an efficient operation and use.

For other objects and for a better understanding of the invention, reference may be had to the following detailed description taken in conjunction with the accompanying drawing, in which:

FIGURE 4 is an exploded perspective view of the bar member shown in FIGURE 1;

FIGURE 5 is a plan view of the sliding member shown in FIGURE 1;

FIGURE 6 is a side view of FIGURE 5;

FIGURE 7 is a fragmentary front view of one of the clips shown in FIGURE 1; and

FIGURE 8 is an end view of FIGURE 7.

Figure 1:
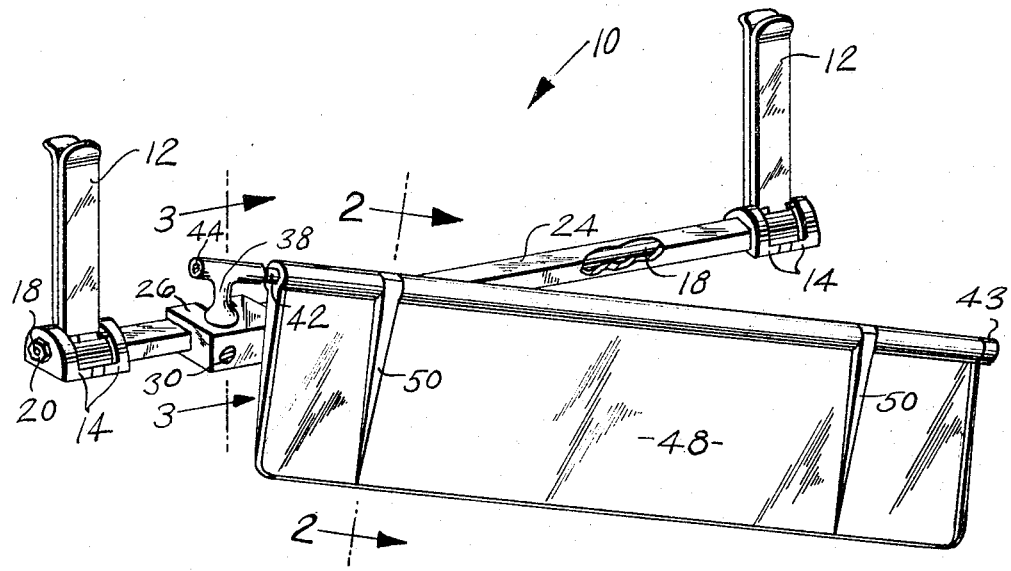
FIGURE 1 is a perspective view of a shade comprising the present invention.
Figure 2:
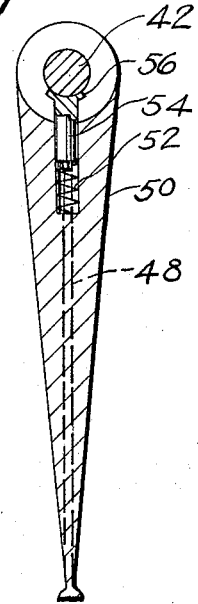
FIGURE 2 is a cross sectional view taken along the lines 2—2 of FIGURE 1.
Figure 3:
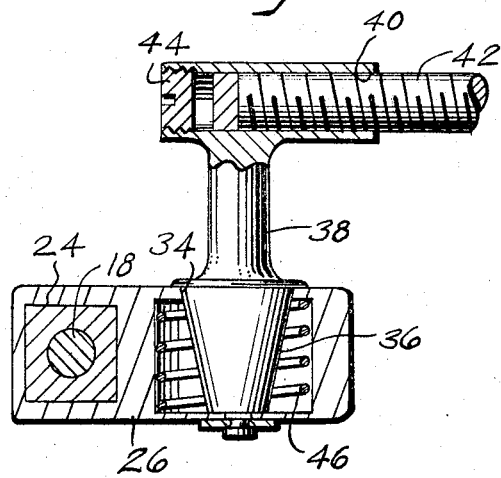
FIGURE 3 is a cross sectional view taken along the lines 3—3 of FIGURE 1.

Referring now more in detail to the drawing, a portable sun glare shade 10 made in accordance with the present invention is shown to include a pair of spaced apart spring clips 12 which provide a means of clipping glare shade 10 to the standard visor within a vehicle. A pair of plates 14 of semicircular configuration confine spring clips 12 and opening 16 through plates 14 provide a means for receiving elongated and threaded shaft 18. Shaft 18 threadingly receives a nut on each end to secure plates 14 in proper position upon shaft 18. Plates 14 are provided with projections 22 which align and position spring clips 12 and an elongated bar 24 of rectangular cross section receives shaft 18 along its longitudinal axis and thus bar 24 slidably receives a block 26. Block 26 is provided with a pair of spaced apart springs 28 which are held in position by means of a pair of threaded screws 30 to apply friction to slidable block 26. Rectangular configurated bar 24 is slidably received within openings 32 of block 26 to permit extensive linear travel of the shade which hereinafter will be described. A circular opening 34 at right angles to and through block 26 receives a tapered shank 36 of a T-shaped member 38 which extends at right angles from block 26. An opening 40 through the horizontal portion of member 38 threadingly receives the threaded end of shaft 42 and shaft 42 is provided with a shoulder stop 43 for a purpose which hereinafter will be described. A plug 44 is threadingly received within opening 40 to seal off the open end of member 38. Spring tension is applied to T-shaped member 38 from within block 26 by a coil spring 46 received within block 26. An elongated shade of rectangular configuration 48 is provided with a pair of spaced apart triangular configurated ribs 50 which provides stiffening for shade 48. Ribs 50 contain a coil spring 52 which springingly urges a pin 54 against the outer periphery of shaft 42. Pins 54 are provided with an arcuate flange 56 which engages a substantial portion of the outer periphery of shaft 42 to allow shade 48 to be secured at any position at which it is set by the user.

Shoulder stop 43 of shaft 42 prevents shade 48 from sliding off the end of shaft 42.

In use, spring clips are snappingly engaged over the existing visor of the vehicle and block 26, when desired, may be slid traversely along rectangular configurated bar 24 to any desired position. Shade 48 pivotably received by block 26 is pivotable throughout 360 degrees of arc to allow the user to place shade 48 in any desired position to prevent glare. It shall thus become apparent that the movable components are all provided with spring loaded means for securing any of the movable components in any particular position desired by the user of the device.

While various changes may be made in the detail construction, it shall be understood that such changes shall be within the spirit and scope of the present invention as defined by the appended claims.

What I claim as new and desire to protect by Letters Patent of the United States is:

1. A portable sun glare shade attachment for motor vehicles comprising, in combination, a hollow, elongated bar of rectangular configuration, a slidable block member mounted on said bar, a pair of spaced apart semi-circular plate members carried by said bar adjacent each end thereof, means on said plate members for positioning a pair of spaced apart and parallel spring clips adapted to engage a visor within the vehicle, an elongated and threaded shaft carried within said bar and extending beyond each end thereof for securing and supporting said plate members, a T-shaped, pivotal member rotatably carried by said bar and an elongated, rectangular shade member adjustably secured to said pivotal member.

2. The combination according to claim 1 wherein said means on said semicircular plates includes projections for aligning and positioning said spring clips.

3. The combination according to claim 2 wherein said semicircular plates include nuts which are threadingly received on the ends of said threaded shaft to secure said plates and said bar to said threaded shaft.

4. The combination according to claim 3, wherein said block is substantially U-shaped and includes a pair of spaced apart spring means engaging said bar for providing tension upon said bar to retain said block in any desired position upon said bar, screw means for biasing said spring means toward said bar whereby said block adapted to traverse said bar from one spring clip to the other spring clip in order to adjustably position said rectangular configurated shade.

5. The combination according to claim 4, wherein said block includes a second spring means for urging said T-shaped member into frictional engagement therewith whereby said T-shaped member can be adjustably positioned relative to said block, and said shade member includes an elongated shaft, one end of which is threadingly received by said T-shaped member.

6. The combination according to claim 5 wherein the other end of said shaft is provided with a shoulder stop to retain said shade on said shaft, and a pair of spaced apart triangular ribs carried by said shade for providing stiffening means for said shade and friction means for holding said shade in any desired position in which said shade may be placed.

7. The combination according to claim 6, wherein said friction means include a spring and a pin having an arcuate flange received within said ribs, said coil springs urging said pins into frictional engagement with the outer periphery of said shaft.

References Cited by the Examiner

UNITED STATES PATENTS

| | | | |
|---|---|---|---|
| 3,095,233 | 6/1963 | Dryden | 296—97 |
| 3,158,396 | 11/1964 | Berger | 296—97 |

BENJAMIN HERSH, *Primary Examiner.*

J. A. PEKAR, *Assistant Examiner.*